(12) United States Patent
Yamashita (10) Patent No.: US 6,751,546 B2
(45) Date of Patent: Jun. 15, 2004

(54) INFORMATION PROCESSING SYSTEM, INFORMATION DEVICE AND INFORMATION PROCESSING DEVICE

(75) Inventor: Makoto Yamashita, Tokyo (JP)

(73) Assignee: Kabushiki Kaisha Toshiba, Kawaski (JP)

( * ) Notice: Subject to any disclaimer, the term of this patent is extended or adjusted under 35 U.S.C. 154(b) by 167 days.

(21) Appl. No.: 09/852,742

(22) Filed: May 11, 2001

(65) Prior Publication Data
US 2001/0055373 A1 Dec. 27, 2001

(30) Foreign Application Priority Data
Jun. 14, 2000 (JP) .................................. 2000-178602

(51) Int. Cl.⁷ .............................................. G01C 21/00
(52) U.S. Cl. ...................... 701/200; 701/213; 701/214; 340/993
(58) Field of Search .......................... 701/35, 200, 201, 701/213, 214; 340/993, 995.1; 455/73, 84; 706/10; 358/462; 714/746

(56) References Cited

U.S. PATENT DOCUMENTS 5,815,472 A * 9/1998 Kuroda et al. ............ 369/47.33
6,018,816 A * 1/2000 Tateyama .................... 714/746
6,515,595 B1 * 2/2003 Obradovich et al. ........ 340/905
6,529,824 B1 * 3/2003 Obradovich et al. ........ 701/208

FOREIGN PATENT DOCUMENTS

| JP | 9-252454 | 9/1997 |
| JP | 2000-50123 | 2/2000 |

* cited by examiner

Primary Examiner—Marthe Y. Marc-Coleman
(74) Attorney, Agent, or Firm—Finnegan, Henderson, Farabow, Garrett & Dunner, L.L.P.

(57) ABSTRACT

The information processing system includes an information device, and an information processing device, wherein the information device further includes a transfer unit which outputs a transfer request of transferring predetermined data processed by the information device, to the information processing device, and transfers the predetermined data to the information processing device when a response is made in reply to the transfer request, and the information processing device further includes receiving unit for receiving the predetermined data in reply to the transfer request, recording unit for recording the predetermined data received by the receiving unit as they are associated with position data indicating a current position, and data processing unit for executing a predetermined process on the basis of the predetermined data and the position data, recorded on the recording unit.

8 Claims, 7 Drawing Sheets

INFORMATION PROCESSING SYSTEM, INFORMATION DEVICE AND INFORMATION PROCESSING DEVICE

CROSS-REFERENCE TO RELATED APPLICATIONS

This application is based upon and claims the benefit of priority from the prior Japanese Patent Application No. 2000-178602, filed Jun. 14, 2000, the entire contents of which are incorporated herein by reference.

BACKGROUND OF THE INVENTION

The present invention relates to an information processing system capable of carrying out data communications between an information device such as an image pick-up device, and an information processing device, and further to an information device and information processing device, used in the information processing system.

Conventionally, a car navigation system such as disclosed in Jpn. Pat. Appln. KOKAI Publication No. 10-211529 is known as an information processing system established by uniting an image pick-up device and an information processing device together.

The car navigation system disclosed in this publication includes an IC card, a car navigation device, a video camera equipped with a GPS (global positioning system), and a personal computer. In this car navigation system, the IC card is set on the video camera and image data picked up with the video camera is recorded on the IC card. During this period, the position data of the place where the image is picked up is acquired from the GPS equipped in the video camera, and the data is recorded on the IC card together with the image data. When a map is displayed on the car navigation device or personal computer while the IC card is set on the device, the image data recorded on the IC card is displayed on the corresponding location on the map on the basis of the position data added to the image data.

In the above-described car navigation system, the GPS equipped in the car navigation device cannot be used from the video camera side. Therefore, a separate GPS must be provided for the video camera in order to acquire position data, thus increasing the cost of the product.

With the conventional technique, since image data picked up by the video camera is recorded on an IC card, while the IC card is being set on the car navigation device or personal computer, the recording of image data cannot be performed.

Further, an IC card has a small memory capacity and therefore it cannot record a great number of image data. As a result, it becomes necessary to transfer the image data recorded on the IC card to the car navigation device or personal computer.

Furthermore, an IC card must be set on the car navigation device, video camera or personal computer at each time, and therefore it takes a lot of trouble for inserting or taking out the IC card. In addition, the connector portion of the IC card may wear out, or the card itself may be lost.

BRIEF SUMMARY OF THE INVENTION

The object of the present invention is to provide an information processing system, which can process data of an information device and position data, as they are associated with each other, without a troublesome operation such as loading/unloading an IC card, as well as such an information device and information processing device.

According to an aspect of the present invention, there is provided an information processing system comprising: an information device; and an information processing device, wherein the information device further comprises: transfer means which outputs a transfer request of transferring predetermined data processed by the information device, to the information processing device, and transfers the predetermined data to the information processing device when a response is made in reply to the transfer request, and the information processing device further comprises: receiving means for receiving the predetermined data in reply to the transfer request; recording means for recording the predetermined data received by the receiving means as they are associated with position data indicating a current position; and data processing means for executing a predetermined process on the basis of the predetermined data and the position data, recorded on the recording means.

According to another aspect of the present invention, there is provided an information processing system comprising: an information device; and an information processing device, wherein the information device further comprises: position acquiring means for acquiring position data indicating a current position from the information processing device by requesting the position data therefrom; transfer means which outputs a transfer request of transferring predetermined data processed by the information device, to the information process, and when a response is made in reply to the transfer request, transfers the predetermined data to the information processing device after adding the position data obtained by the position acquiring means to the predetermined data, and the information processing device further comprises: position measuring means for measuring a current position; position transmitting means for transmitting position data indicating the current position measured by the position measuring means, to the information device when a request is made by the information device; receiving means for receiving the predetermined data with the position data added thereto, in reply to the transfer request from the information device; recording means for recording the predetermined data and position data received by the receiving means as the predetermined data and the position data are associated with each other; and data processing means for executing a predetermined process on the basis of the predetermined data and the position data, recorded on the recording means.

According to still another aspect of the present invention, there is provided an information processing system comprising: an information device; and an information processing device, wherein the information device further comprises: transfer request means for outputting a transfer request of transferring predetermined data processed by the information device, to the information processing device; holding means for holding the predetermined data when a response is not made in reply to the transfer request output from the transfer request means; and data transfer means for transferring the predetermined data held in the holding means when a response is made in reply to the transfer request, and the information processing device further comprises: receiving means for receiving the predetermined data in reply to the data transfer request from the information device; recording means for recording the predetermined data received by the receiving means as they are associated with position data indicating a current position; and data processing means for executing a predetermined process on the basis of the predetermined data and the position data, recorded on the recording means.

According to still another aspect of the present invention, there is provided an information processing system comprising: an information device; and an information processing device, wherein the information device further comprises: first authentication means for authenticating whether the information processing device is an opponent who is permitted to communicate with; and transfer means for transferring the predetermined data processed by the information device to the information processing device when the information processing device is authenticated as a registered opponent by the first authentication means, and the information processing device further comprises: second authentication means for authenticating whether the information processing device is an opponent who is permitted to communicate with; receiving means for receiving the predetermined data when the information device is authenticated as a registered opponent by the second authentication means; recording means for recording the predetermined data received by the receiving means and position data indicating a current position as they are associated with each other; and data processing means for executing a predetermined process on the basis of the predetermined data and the position data, recorded on the recording means.

According to still another aspect of the present invention, there is provided an information processing system comprising: an information device; and an information processing device, wherein the information device further comprises: position acquiring means for acquiring position data indicating a current position from a separate particular device from the information processing device; and transfer means which outputs a transfer request of transferring predetermined data processed by the information device, to the information process, and when a response is made in reply to the transfer request, transfers the predetermined data to the information processing device after adding the position data obtained by the position acquiring means to the predetermined data, and the information processing device further comprises: data receiving means for receiving the predetermined data with the position data added thereto, in reply to the transfer request from the information device; recording means for recording the predetermined data and position data received by the data receiving means as the predetermined data and the position data are associated with each other; and data processing means for executing a predetermined process on the basis of the predetermined data and the position data, recorded on the recording means.

According to still another aspect of the present invention, there is provided an information device comprising: communication means for establishing communication with an external device having a position measuring function; position acquiring means for acquiring position data indicating a current position by requesting the position data from the external device; and recording means for recording the position data obtained by the position acquiring means and the predetermined data processed by the information device.

According to still another aspect of the present invention, there is provided an information device comprising: communication means for establishing communication with an external device having a position measuring function; position acquiring means for acquiring position data indicating a current position by requesting the position data from the external device; and transfer means which outputs a transfer request of transferring predetermined data to the external device, and when a response is made in reply to the transfer request, transfers the predetermined data to the external device after adding the position data obtained by the position acquiring means to the predetermined data.

According to still another aspect of the present invention, there is provided an information processing device comprising: communication means for establishing communication with an external device; position measuring means for measuring a current position; and position transmitting means for transmitting position data indicating the current position measured by the position measuring means, to the external device in reply to a position request made by the external device.

According to still another aspect of the present invention, there is provided an information processing device comprising: communication means for establishing communication with an external device; receiving means for receiving predetermined data processed by the external device in reply to a transfer request from the external device; position measuring means for measuring a current position; recording means for recording the predetermined data received by the receiving means and position data indicating the current position measured by the position measuring means as they are associated with each other; and data processing means for executing a predetermined process on the basis of the predetermined data and the position data, recorded in the recording means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The information processing system of the present invention will now be described with reference to accompanying drawings. An embodiment provided below will be explained in connection with a car navigation system which uses a digital still camera serving as an information device, and a car navigation device as an information processing device.

Figure 1:
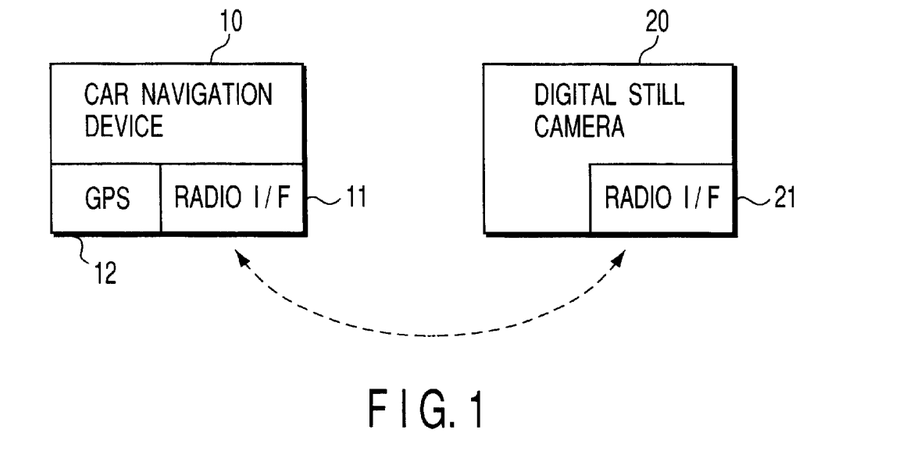
FIG. 1 is a block diagram showing the structure of a car navigation system according to an embodiment of the present invention.

FIG. 1 is a block diagram showing the structure of a car navigation system according to an embodiment of the present invention.

As shown in FIG. 1, the car navigation system of this embodiment includes a car navigation device 10 and a digital still camera 20. The car navigation device 10 and digital still camera 20 have radio interfaces 11 and 21, respectively, so that they are capable of data communication with each other by radio.

As the radio interfaces 11 and 21, for example, Bluetooth is used. Bluetooth is a radio interface based on the radio communication specification for short distance, and radio communication within about 10 m is performed with use of radio wave of an ISM (industrial scientific medical) band of 2.45 GHz.

It should be noted that the connection means for connecting the car navigation device 10 and digital still camera 20 together, is not limited to a radio wave in particular, but it may be, for example, infrared (IrDA) radiation. In the case of infrared radiation, such a problem in directivity may arise that communication is disabled when an obstacle is present between the navigation device and the camera. Therefore, the connection via the radio wave is preferable.

The car navigation device is mounted on a vehicle (automobile). This car navigation device 10 displays a map together with the current position on the map, so as to guide the traveling route to the destination designated by the user. Here, a GPS 12 is used as the means for measuring the current position. The digital still camera 20 is a device for picking up a still image.

Specific structures of the car navigation device 10 and the digital still camera 20 will be explained later with reference to FIGS. 3 and 4.

Figure 2:
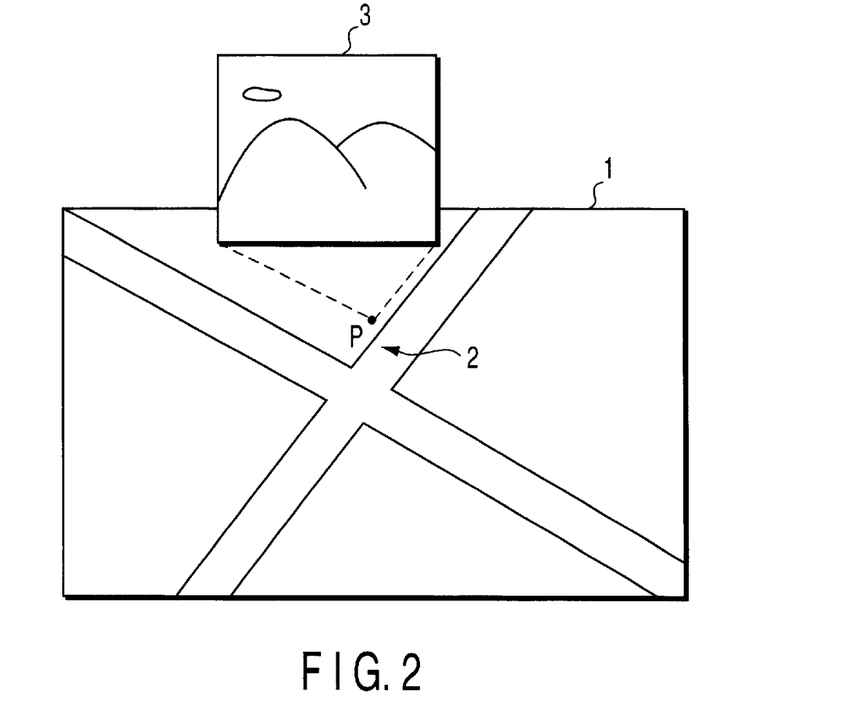
FIG. 2 is a diagram showing an example of a displayed image realized in the car navigation system.

FIG. 2 shows an example of a displayed image realized by the car navigation system of the present invention. In this figure, a map 1 displayed on the screen of the car navigation device 10, a mark 2 indicating the current position, and a still image 3 picked up by the digital still camera 20 are illustrated.

The still image 3 is set in the car navigation device 1 to be associated with a position P indicating the location point where the image was shot. The data of the position P is measured by the GPS 12 equipped in the car navigation device 1. When a vehicle indicated by the mark 2 on the map 1 passes near the position P, or the user gives an instruction to display the image by operating a button (not shown), the still image 3 is displayed on the map 1 as being superimposed.

Next, the structures of the car navigation device 10 and the digital still camera 20 which constitute the car navigation system will now be described.

Figure 3:
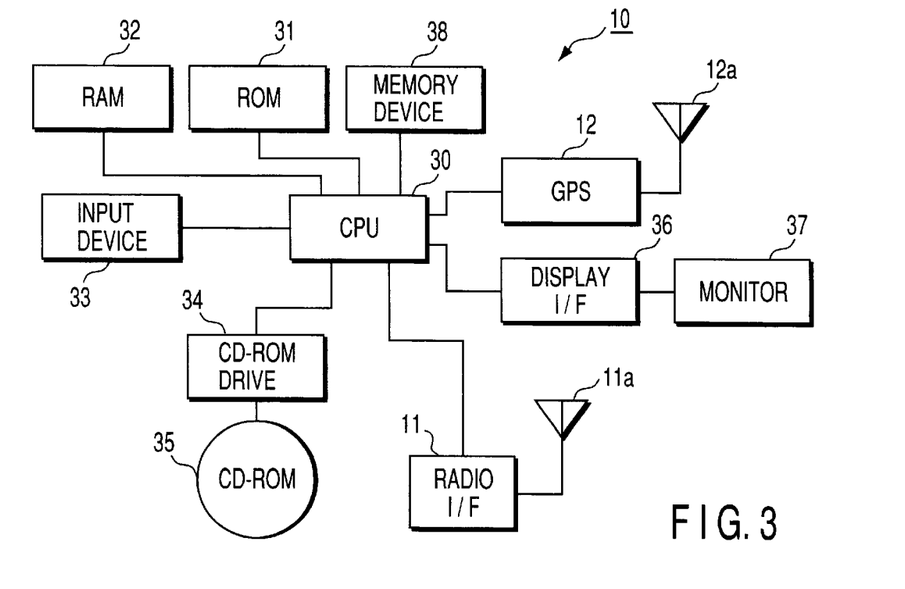
FIG. 3 is a block diagram showing the detailed structure of a car navigation device used in the car navigation system.

FIG. 3 is a block diagram showing the structure of the car navigation device 10 in details.

The car navigation device 10 includes a CPU 30, ROM 31 and RAM 32.

The CPU 30 controls the entire operation of the car navigation device 10. That is, it reads out a program stored in the ROM 31, and executes various processes in compliance with respective predetermined procedures described in the program. The ROM 31 stores various data including programs. The RAM 32 is used as a work memory for storing data necessary for the CPU 30 to execute processes.

The car navigation device 10 is provided with an input device 33, a CD-ROM drive 34, a CD-ROM 35, a display interface 36, a monitor 37, a memory device 38, etc. in addition to the radio interface 11 and the GPS 12 shown in FIG. 1.

The radio interface 11 is designed to realize data communication with an external device, based on the radio specification of, for example, Bluetooth. To the radio interface 11, a radio antenna 11a for transmitting and receiving radio waves is connected. The GPS 12 is a module for measuring the current position. To the GPS 12, a GPS antenna 12a for receiving the radio wave indicating the current position is connected.

The input device 33 is designed to receive an input from the user, and is a remote control key provided with various operation buttons.

The CD-ROM drive 34 is a drive for reading out data stored in the CD-ROM 35. The CD-ROM 35 stores map data of various areas in advance.

The display interface 36 executes a process for displaying map data, image data, etc. on a monitor 37. The monitor 37 is, for example, an LCD (liquid crystal display).

The memory device 38 is made of a large-capacity memory means such as DVD-RAM. In the memory device 38, a great number of image data obtained by the digital still camera 20 are recorded together with the position data obtained by the GPS 12.

In the above-described structure, when the display of the current position is instructed through the input device 33, the current position is measured by the GPS 12 and the data indicating the current position is given to the CPU 30. When receiving the data for the current position, the CPU 30 starts the CD-ROM drive 34 and reads the map data containing the current position from the CD-ROM 35 to be displayed on the monitor 37. On the display, the mark indicating the current position is superimposed on the map.

Figure 4:
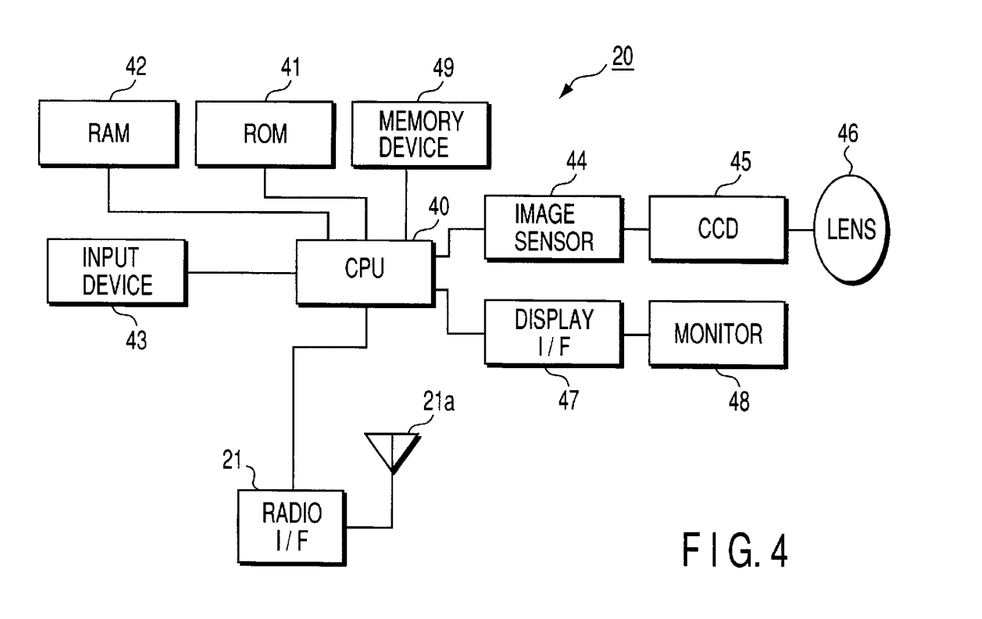
FIG. 4 is a block diagram showing the detailed structure of a digital still camera used in the car navigation system.

FIG. 4 is a block diagram showing the structure of the digital still camera 20 in detail.

The digital still camera 20 has a CPU 40, ROM 41 and RAM 42.

The CPU 40 controls the entire operation of the digital still camera 20. That is, it reads out a program stored in the ROM 41, and executes various processes in compliance with respective predetermined procedures described in the program. The ROM 41 stores various data including programs. The RAM 42 is used as a work memory for storing data necessary for the CPU 40 to execute processes.

The digital still camera 20 is provided with an input device 43, an image sensor interface 44, a CCD 45, a lens 46, a display interface 47, a monitor 48, a memory device 49, etc. in addition to the radio interface 21 shown in FIG. 1.

The radio interface 21 is designed to conduct data communication with an external terminal based on the radio specification of, for example, Bluetooth. To the radio interface 21, a radio antenna 21a for transmitting and receiving a radio wave is connected.

The input device 43 is designed to receive an input from the user, and has a shutter, operation switch, etc. The image sensor interface 44 subjects the image of an object shot with the CCD 45, to digital conversion, and outputs the converted data to the CPU 40. The CCD 45 photoelectrically converts the image of the object picked up through the lens 46. The lens 46 is an image pick-up lens for picking up the image of an object.

The display interface 47 executes a process for displaying an image picked up, a viewfinder image while shooting a scene, etc. on a monitor 48. The monitor 48 is a display device for actually displaying an image and the like.

The memory device 49 is made of a small-sized IC memory card such as SmartMedia or CF (Compact Flash). In this memory device 49, a predetermined number of image data shot with the digital still camera 20 are recorded.

In the above-described structure, when an instruction of shooting is input through the input device 43 (that is, when the shutter button is pressed), the image of an object inputted through the lens 46 is photoelectrically converted by the CCD 45. An analog image obtained by the photoelectric conversion is converted into a digital image by the image sensor interface 44, and then stored as data image of one shot (still image) in the memory device 49. At the same time, the digital image converted by the image sensor interface 44 is given also to the display interface 47 and displayed on the monitor 48.

It should be noted that when image data is recorded in the memory device 49, the image data may be compressed by JPEG (Joint Photographic Experts Group), or it may be compressed by motion picture compressing method such as MPEG (Motion Picture Experts Group).

The above is an explanation of the general operation in the case where the car navigation device 10 and the digital still camera 20 are separately used.

Next, the operation of the car navigation system in which the car navigation device 10 and the digital still camera 20 are united will now be described.

As described above, data communication can be performed via radio wave between the car navigation device 10 and the digital still camera 20 (See FIG. 1). In this system, the radio communication between the car navigation device 10 and the digital still camera 20 is utilized so as achieve the following points.

(1) The first point is that image data picked up with the digital still camera 20 is recorded in the recording device 38 of the car navigation device 10.

That is, conventionally, image data picked up with digital still camera 20 is recorded in the memory (recording device 49) in the digital still camera 20. By contrast, in the present system, image data picked up with the digital still camera 20 is transferred to the car navigation device 10 via the radio interface 21. The car navigation device 10 receives the image data transferred from the digital still camera 20 via the radio interface 11. At the same time, the CPU 30 acquires the current position data from the GPS 12 built in the car navigation device 10, and thus the position data is recorded in the memory device 38 after being associated with the image data received from the digital still camera 20.

Thus, the image data picked up with the digital still camera 20 is not recorded in the memory device 49 of the digital still camera 20, but transferred to the car navigation device 10, and recorded in the memory device 38 of the navigation device 10. With this structure, the following advantage can be obtained.

That is, it is not necessary to load/unload and IC card unlike in the conventional technique, for the case where image data shot by the digital still camera 20 is displayed while superimposed on map data displayed on the monitor 37 of the car navigation device 10 as shown in FIG. 2.

Further, generally, an IC card used as the memory device 49 of the digital still camera 20 has a small capacity of 64 megabytes or 128 megabytes, and therefore such an IC card cannot store a great number of image data. By contrast, a DVD-RAM used as the memory device 38 of the car navigation device 10 has a large capacity of 5.2 gigabytes. Therefore, image data taken with the digital still camera 20 are transferred one after another to the car navigation device 10 and recorded in the memory device 38 thereof. Thus, the user can keep on shooting scenes without having to care about the memory capacity of the digital still camera 20.

(2) The second point is that the digital still camera 20 acquires position data from the car navigation device 10, and adds it to image data, to be recorded.

More specifically, in the case where image data is recorded in the memory device 49 together with the position data indicating the location where the image was shot, in the digital still camera 20, the CPU 40 outputs an instruction for the car navigation device 10 via the radio interface 21 to send the current position data.

When the car navigation device 10 receives an instruction from the digital still camera 20 via the radio interface 11, the CPU 30 detects and understands the instruction, and then transmits the current position data measured by the GPS 12 to the digital still camera 20 via the radio interface 11. When the digital still camera 20 receives the position data via the radio interface 21, the CPU 40 associates the position data with the image data, and records them in the recording device 49.

As described above, when an image picked up with the digital still camera 20 is recorded in the internal memory (recording device 49), the position data indicating the location where the image was shot is obtained from the car navigation device 10 via radio communication. With the above-described structure, the following advantage can be achieved.

That is, there is no need to provide a device for measuring the current position on the digital still camera 20, and therefore the production cost can be reduced accordingly.

(3) The third point is that image data is temporarily held in the digital still camera 20, and while communication between the car navigation device 10 and digital still camera 20 is enabled, image data is transferred from the digital still camera 20 to the car navigation device 10.

That is, in the before-described point (1), image data picked up by the digital still camera is transferred at once to the car navigation device 10 by radio. By contrast, in the point (3), image data is temporarily recorded in the memory device 49, and then, while radio communication between the car navigation device 10 and digital still camera 20 is enabled, image data is read out from the memory device 49 and transferred from the memory device 49 to the car navigation device 10 by radio, to be recorded in the memory device 38 of the car navigation device 10.

Thus, with the structure in which image data is temporarily held by the digital still camera 20 and then transferred to the car navigation device 10, the following advantage can be obtained.

That is, in the case where the power of the car navigation device 10 is off, or the communication status between the camera and the navigation device is poor, or even while image is being transferred to the car navigation device 10, the shooting with the digital still camera 20 can be continued. In such a case, image data are recorded in the internal memory, therefore, it becomes possible to take a picture directly after one has just been taken.

It should be noted that the points (1) to (3) above are realized by carrying out radio communication between the car navigation device 10 and digital still camera 20 in compliance with a predetermined protocol. The communication procedure will now be described in detail.

Figure 5:
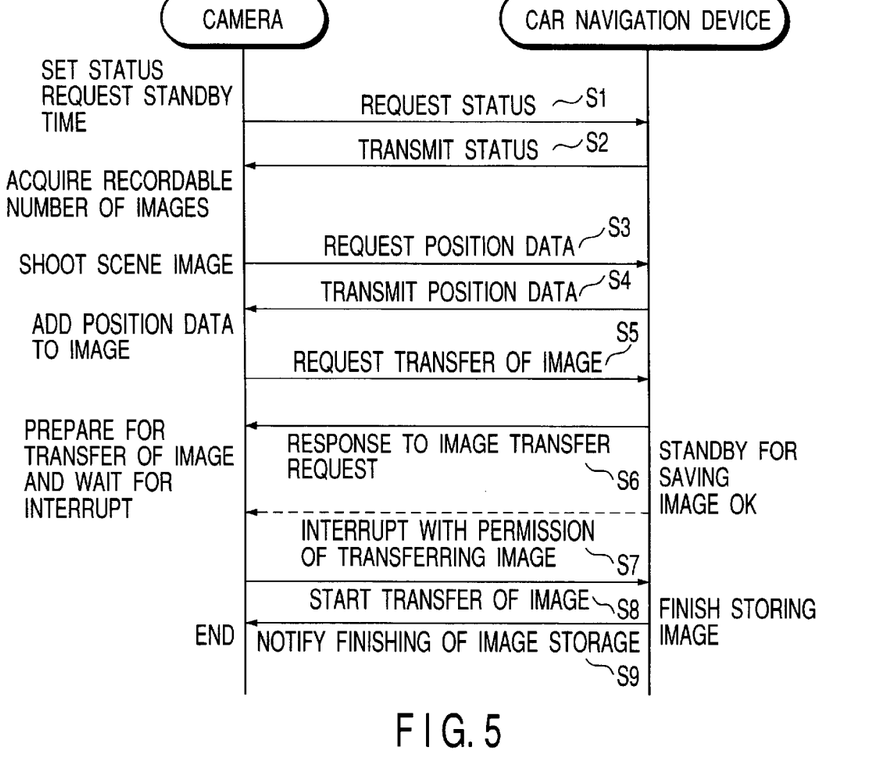
FIG. 5 is a sequence diagram showing a communication procedure between the car navigation device and the digital still camera.

FIG. 5 is a sequence diagram indicating a communication procedure between the car navigation device 10 and digital still camera 20. The left-hand side of the figure indicates the process by the digital still camera 20 and the right-hand side indicates the process by the car navigation device 10.

As shown in FIG. 5, on the side of the digital still camera 20, first, a predetermined status request standby time is set before shooting, and then a status request signal is output to the car navigation device 10 (step S1). In reply to the status request signal, the car navigation device 10 transmits status data of itself (step S2). The status data contains free area data of the memory device 38 equipped in the car navigation device 10.

When the digital still camera 20 receives the status data of the car navigation device 10, it checks the free area of the memory device 38 of the navigation device 10 on the basis of the status data, and calculates out the number of image data (still images) which can be transferred to the navigation device 10. Here, if it is judged that there is no sufficient free area for storing image data in the navigation device 10, the shooting with the digital still camera 20 is prohibited. Alternatively, the shooting with the camera 20 is permitted but the transfer of the image data to the navigation device 10 is prohibited.

In the case where there is a free area for storing image data in the memory device 38 of the car navigation device 10, the shooting with the digital still camera 20 is enabled. Then, when a scene is shot by pressing the shutter bottom, the digital still camera 20 transmits a position data request signal to the navigation device 10 (step S3). When the navigation device 10 receives the position data request signal, the current position data at that point of time is acquired from the GPS 12 and transmits it to the digital still camera 20 (step S4).

When the digital still camera 20 receives the current position data transmitted from the car navigation device 10, the position data is added to shot image as the data indicating the position where the image was shot, then an image transfer request signal is transmitted to the navigation system 10 (step S5). When the navigation device 10 receives the image transfer request signal, a response signal corresponding to the request signal is transmitted to the digital still camera 20 (step S6).

Upon reception of the response signal corresponding to the request signal, the digital still camera 20 stands by and waits for an interrupt signal indicating the permission of the transfer of the image to come from the car navigation device 10 of the opponent. At this moment, the digital still camera 20 is in a stand-by state for an interrupt signal, and therefore the camera 20 need not to keep on waiting for a signal from the navigation device 10, but can save the image data containing the added position data temporarily in a memory (memory device 49), so as to become able to execute other process than the transfer of the image.

On the other hand, when the car navigation device 10, is in a state where image data cannot be directly received, such as where other process is being executed, an interrupt signal permitting the image transfer may be transmitted after the completion of the process being executed. In this manner, it becomes possible to receive image data at a timing convenient for the car navigation device 10.

When the preparation for storing an image is completed on the side of the car navigation device 10, it transmits an interrupt signal permitting image transfer, to the digital still camera 20 (step S7).

Upon receiving the interrupt signal, the digital still camera 20 starts to transfer image data to the car navigation device 10 (step S8). The image data contains position data added thereto to indicate the location of the scene was shot. The navigation device 10 receives image data transferred from the digital still camera 20, and stores it in the memory device 38. When the saving of the image is completed, the navigation device sends an image storage completion notification to the digital still camera 20 (step S9).

In this procedure, a series of processing operations including the addition of position data to image data taken with the digital still camera 20, and the recording it in the memory device 38 of the navigation device 10, are completed.

In the procedure shown in FIG. 5, position data is transmitted from the car navigation device 10 to the digital still camera 20, and the position data is added to the corresponding image data on the side of the digital still camera 20 (steps S3 and S4). As an alternative to this, it is also possible that, for example, when the car navigation device 10 receives an image transfer request from the digital still camera 20, the position data obtained at the time of reception of the request is held (steps S5 and S6), and then the position data is added to the image data when the image data is received from the digital still camera 20 (steps S7 and S8).

Next, a communication procedure in the case where the car navigation device 10 is in an inactive state when the digital still camera 20 is to communicate with the car navigation device 10, will now be described.

Figure 6:
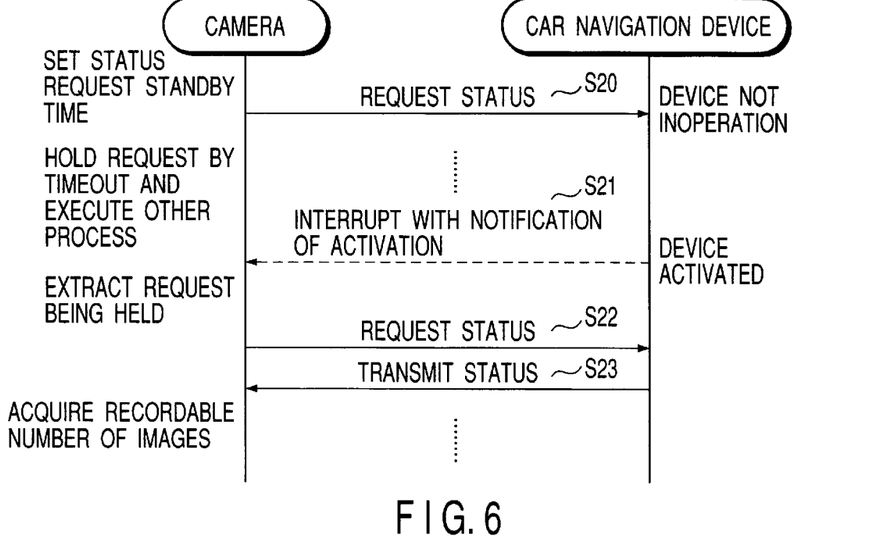
FIG. 6 is a sequence diagram showing a communication procedure in the case where the car navigation device is in an inactive state.

FIG. 6 is a sequence diagram showing the communication procedure in the case where the navigation device 10 is in an inactive state. The left-hand side of the figure indicates the process by the digital still camera 20 and the right-hand side indicates the process by the car navigation device 10.

As shown in FIG. 6, on the side of the digital still camera 20, first, a predetermined status request standby time is set before shooting, and then a status request signal is output to the car navigation device 10 (step S20).

Let us suppose here a case where the car navigation device 10 is in a state where it cannot make any response to the digital still camera 20, for example, when the power of the navigation device 10 is OFF.

In such a case, even if the set status request standby time is run up on the side of the digital still camera 20, no response can be obtained from the car navigation device 10. Therefore, the status request signal is held in, for example, the RAM 42, other process is executed in the digital still camera 20 until the car navigation device 10 recovers its activation state. An example of this other process is that scenes are continuously shot, and image data obtained by the shootings are recorded in the memory (memory device 49).

After that when the power of the car navigation device 10 is turned on to the activation state, the navigation device 10 transmits an interrupt signal notifying the activation to the digital still camera 20 (step S21). Upon receiving the activation notifying interrupt signal, the digital still camera 20 transmits a status request signal held in the memory again to the navigation device 10 (step S22). At this moment, the navigation device 10 is activated, and therefore, it can receive the status request signal. Thus, the car navigation device 10 transmits a status signal to the digital still camera (step S23).

From then on, the procedure steps are similar to steps S3 to S9 shown in FIG. 5, and the current position data is added to the image data shot with the digital still camera 20, and the data is recorded in the memory device 38 of the navigation device 10.

Incidentally, there are possible cases where the car navigation device 10 cannot be make any response to the digital still camera 20 due to the fact that the power of the navigation device 10 is turned off while performing the shooting with the digital still camera 20, or due to a poor communication state between the digital still camera 20 and the navigation device 10. Therefore, not only for the status request described with reference to FIG. 6, but also when any type of request is made to the navigation device 10 from the digital still camera 20, a waiting time for the request should be set.

If there is no response returned from the navigation device 10 to the digital still camera 20 within the set waiting time, the request signal at that time is held in the memory of the digital still camera 20, and some other process is executed during the timeout period. Then, when an activation notification interrupt signal is output from the navigation device 10 and it is received by the digital still camera 20, the request signal saved in the memory is transmitted again to the car navigation device 10.

In this manner, it is possible to avoid such a problem that the digital still camera 20 keeps on waiting for a response from the car navigation device 10 in the case of making some other request.

(4) The fourth point is that authentication is made between the car navigation device 10 and digital still camera 20.

In the cases of the points (1) to (3), the transfer of data can be freely carried out between the navigation device 10 and the digital still camera 20. By contrast, in the point (4), the mutual authentication process is performed between two members, and only when the authentication is established, the transfer of data is permitted.

Figure 7A:
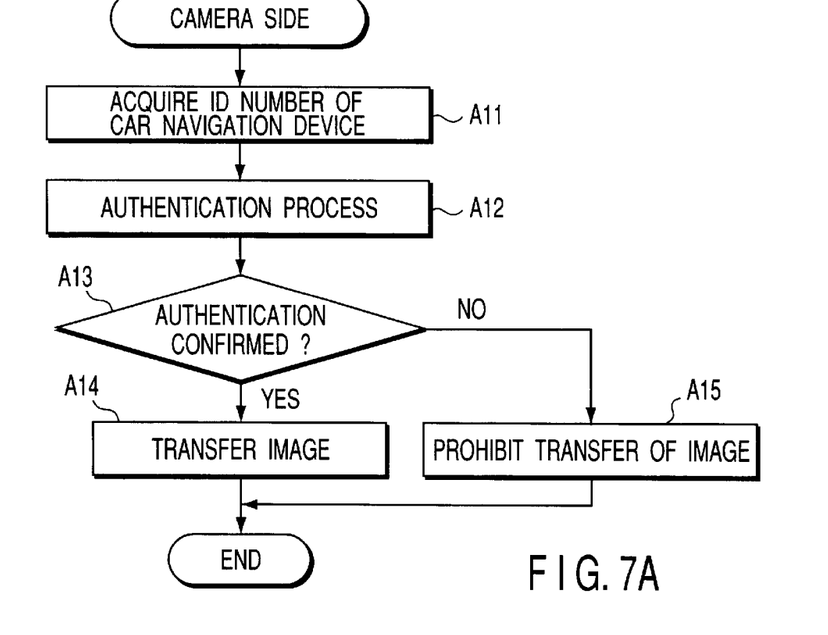
FIGS. 7A and 7B are flowcharts for describing a data transfer process which includes a certification process.
Figure 7B:
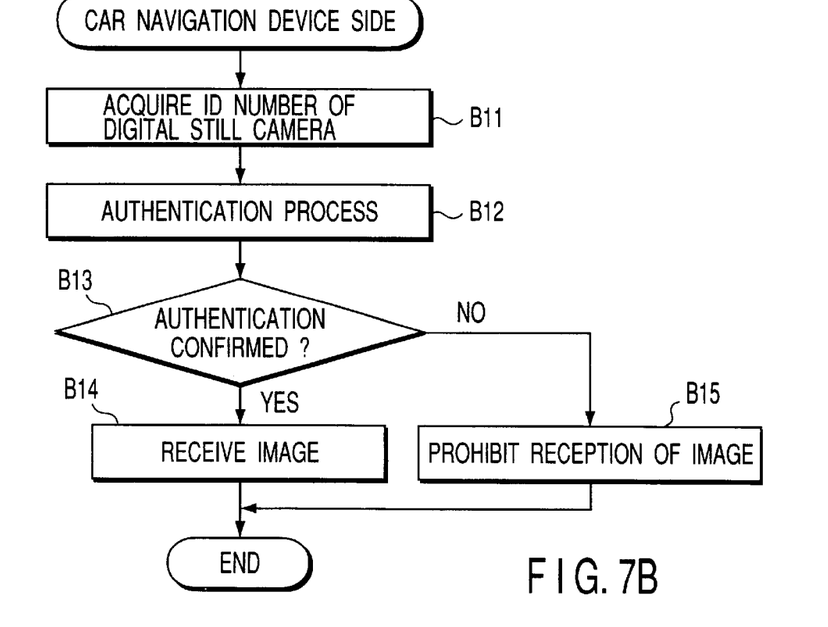

FIGS. 7A and 7B are flowcharts illustrating a data transferring process which contains an authentication step. FIG. 7A is designed to illustrate the processing operation of the digital still camera 20, whereas FIG. 7B is designed to illustrate the processing operation of the navigation device 10.

As shown in FIG. 7A, at the start of communication, the digital still camera 20 acquires an identification number of the car navigation device 10 (step A11). Here, in the RAM 42 of the digital still camera 20, the identification numbers of opponents admitted as communicators are registered in advance. The CPU 40 of the digital still camera 20 compares the identification number of the car navigation device 10 with those identification numbers registered in the RAM 42 so as to judge whether or not the car navigation device 10 is an admitted one of those of the possible communicators (step A12). That is, when the identification number of the car navigation device 10 coincides with one registered in the RAM 42 in advance, the CPU 40 judges that the navigation device 10 is an admitted communication opponent (YES in step A13), and transfers the image data to the navigation device 10 via the radio interface 21 (step A14).

On the other hand, when the identification number of the car navigation device 10 does not coincide with one registered in the RAM 42 in advance, the CPU 40 judges that the navigation device 10 of the transmitter is not an admitted communication opponent (NO in step A13). In this case, the CUP 40 prohibits the transfer of the image data, and save the data in the memory (memory device 49) (step A15).

In the car navigation device 10, a similar authentication step is carried out.

That is, as shown in FIG. 7B, at the start of communication, the car navigation device 10 acquires an identification number of the digital still camera 20 (step B11). Here, in the RAM 42 of the car navigation device 10, the identification numbers of opponents admitted as communicators are registered in advance. The CPU 30 of the car navigation device 10 compares the identification number of the digital still camera 20 with those identification numbers registered in the RAM 32 so as to judge whether or not the digital still camera 20 is an admitted one of those of the possible communicators (step B12).

That is, when the identification number of the digital still camera 20 coincides with one registered in the RAM 32 in advance, the CPU 30 judges that the digital still camera 20 is an admitted communication opponent (YES in step B13), and receives the image data sent from the digital still camera 20 via the radio interface 21 to be stored in the memory device 38 (step B14).

On the other hand, when the identification number of the digital still camera 20 does not coincide with one registered in the RAM 32 in advance, the CPU 30 judges that the digital still camera 20 is not an admitted communication opponent (NO in step B13), and prohibits the reception of the image data (step B15). Here, it is possible that such a message indicating that the reception of image data is rejected is notified to the digital still camera 20. When the notification of the rejection is received, the digital still camera 20 saves the image data in its memory (the memory device 49).

It should be noted that FIGS. 7A and 7B are described in connection with the case where data is transferred from the digital still camera 20 to the car navigation device 10; however a similar argument may be applied to the case where data is transferred from the car navigation device 10 to the digital still camera 20. In any case, an authentication process is carried out with respect to each other between them, and the transfer of data is permitted only when the authentication is confirmed with each other.

As described above, with the authentication process carried out between the car navigation device 10 and the digital still camera 20, it is possible to prevent data from being transferred to a wrong device even when there are some other devices having the same type of radio interfaces, near the navigation device 10 and the camera 20 which should actually be communicating with each other. Therefore, such a trouble that an image shot with the digital still camera 20 is sent to the navigation device of some other user, or an image shot with the camera of some other user is received by the navigation device 10 is prevented, thus, the security of data can be kept.

(5) The fifth point is that position data is acquired from a mobile phone.

That is, for example, in a PHS (Personal Handyphone System), there is a position information service which is operated by utilizing base stations of the system, and with this service, it is possible to acquire the position data at an accuracy of about 100 to 500 m in diameter.

Figure 8:
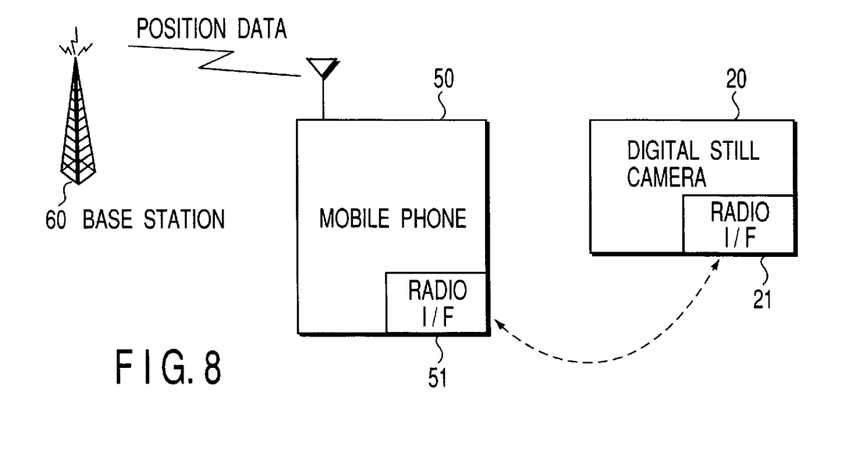
FIG. 8 is a block diagram showing the structure in the case where position data is required with use of a mobile telephone which is in compliance with the position data service.

In this case, as shown in FIG. 8, a radio interface 51 of the same type (for example, Bluetooth) as that of the car navigation device 10 and digital still camera 20, is provided for a mobile phone 50 capable of receiving the position information service. The mobile phone 50 acquires the position data from a base station 60. Then, when shooting a scene, the digital still camera 20 establishes radio communication with the mobile phone 50, receives the position data from the mobile phone 50 and adds the position data to the image data. The image data containing thus added position data is stored in the memory (memory device 49) of the digital still camera 20, or transferred to the car navigation device 10 to be stored in the memory (memory device 38) of the car navigation device 10.

With the above-described structure, in which position data to be added to image data shot with the digital still camera 20 is acquired from the mobile phone 50 via radio communication, a device especially for measuring the current position is no longer necessary for the digital still camera 20.

Alternatively, in the case where the information processing device is not a car navigation device 10 such as above but some other device which does not have a position measuring function, it is possible to establish a structure in which such a device is designed to acquire position data from a mobile phone 50 such as above in a similar manner to the above.

Further, in the case where a radio communication is set up with a mobile phone 50, it is preferable that such an authentication process as described in the above point (4) should be provided.

(6) The sixth point is that position data is acquired by utilizing a mobile phone equipped with a GPS.

In the case of the position information service described in the point (5), the accuracy of the position data is about 100 to 500 m in diameter; however, with use of a GPS, it becomes possible to acquire position data at an accuracy of about 5 to 100 m in diameter.

Figure 9:
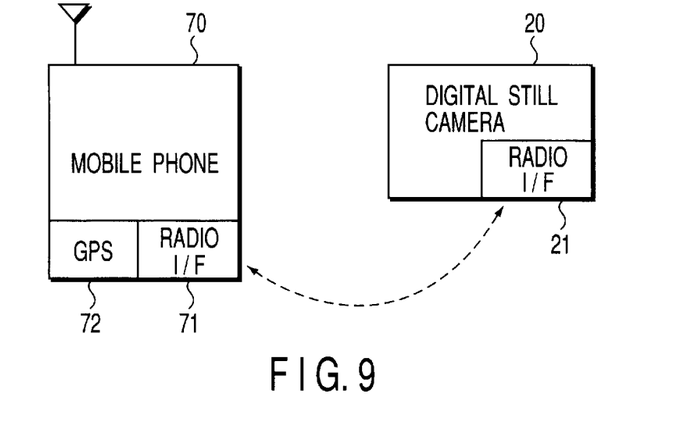
FIG. 9 is a block diagram showing the structure in the case where position data is required with use of a mobile telephone having a GPS function.

In this case, as shown in FIG. 9, a radio interface 71 of the same type (for example, Bluetooth) as that of the car navigation device 10 and digital still camera 20, as well as a GPS 72 are provided for a mobile phone 70. With this structure, when shooting a scene, the digital still camera 20 establishes radio communication with the mobile phone 70, and transmits a request signal for position data to the mobile phone 70. Upon reception of the request signal, the mobile phone 70 measures the current position with the GPS 72, and transmits the position data to the digital still camera 20. The digital still camera 20 receives the position data from the mobile phone 70 and adds the position data to the image data. The image data containing thus added position data is stored in the memory (memory device 49) of the digital still camera 20, or transferred to the car navigation device 10 to be stored in the memory (memory device 38) of the car navigation device 10.

With the above-described structure, in which the mobile phone 70 equipped with a GPS function, it becomes possible to acquire more accurate position data than that of the case of the point (5), which is stored together with image data.

Alternatively, in the case where the information processing device is not a car navigation device 10 such as above but some other device which does not have a position measuring function, it is possible to establish a structure in which such a device is designed to acquire position data from a mobile phone 70 such as above in a similar manner to the above.

Further, in the case where a radio communication is set up with a mobile phone 70, it is preferable that such an authentication process as described in the above point (4) should be provided.

(7) The seventh point is the application of the present invention to other device than a digital still camera.

Figure 10:
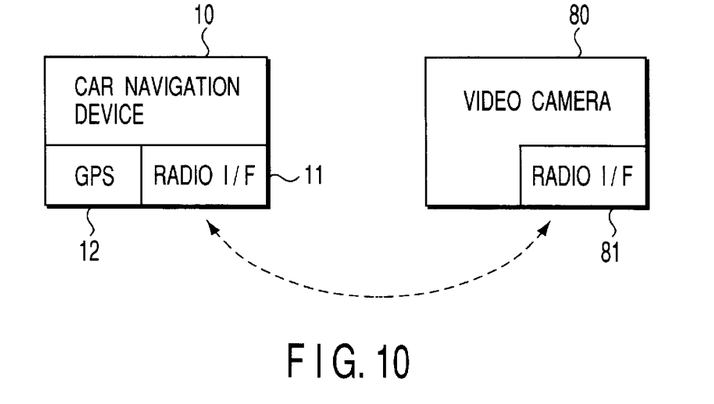
FIG. 10 is a block diagram illustrating the structure for transferring moving image data taken with a video camera to the car navigation device.

The above points (1) to (6) are described in connection with cases where the digital still camera 20 is used as the information device; however as shown in FIG. 10, it is also possible to establish a structure in which a radio interface 81 is provided for a video camera 80, and moving image data shot and processed by a video camera 80 is transferred from the video camera 80 to the car navigation device 10. In the car navigation device 10, the moving image data and position data are associated with each other, and then stored in the memory (memory device 38). When map data is displayed on the monitor 37, the moving image data is reproduced on the basis of the position data.

Figure 11:
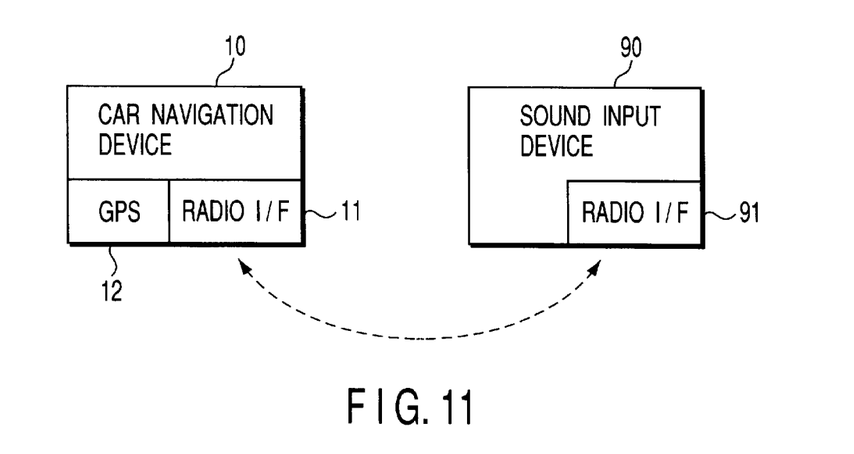
FIG. 11 is a block diagram illustrating the structure for transferring sound data from a sound input device to the car navigation device.

Further, as shown in FIG. 11, it is also possible to establish a structure in which a radio interface 81 is provided for a sound input device 90, and sound data input and processed by the sound input device 90 is transferred from the sound input device 90 to the car navigation device 10. In the car navigation device 10, the sound data and position data are associated with each other, and then stored in the memory (memory device 38). When map data is displayed on the monitor 37, the sound data is reproduced on the basis of the position data.

The above-described moving image data and sound data are those varying in time series. The following is an explanation of the technique of processing data varying in time series, while associating it with position data.

Figure 12:
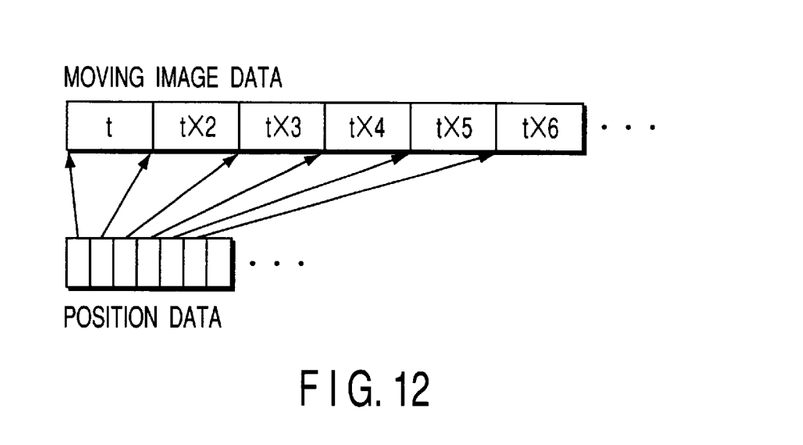
FIG. 12 is a diagram illustrating a method of adding moving image data to position data.

Let us suppose now a case where moving image data is transferred from a video camera 80 to a car navigation device 10 as shown in FIG. 12. In this case, position data each indicating a current position are obtained at predetermined intervals of time t, are acquired in synchronous with moving image data shot continuously with the video camera 80, and the position data at intervals of time t above are added to the moving image data after the shooting, then transferred to the car navigation device 10. The moving image data within the time t contains frame images in a predetermined number.

The position data may be acquired from the navigation device 10 as described in the points (1) to (3) or it may be acquired from the mobile phone 50 or 70 as described in the point (5) or (6), respectively.

Alternatively, it is possible that moving image data shot by the video camera 80 is directly transferred to the car navigation device 10, and the position data at intervals of time t are added to the moving image data in the car navigation device 10, then recorded therein. In the case where moving image data shot by the video camera 80 are sent directly to the car navigation device 10, if the communication is disabled in the middle of the transferring the moving image data, the moving image data itself is lost. Therefore, it is preferable that such a method that the moving image data are held temporarily in the video camera 80, and the moving image data are transferred together with the position data after confirming the communication state, should be employed.

In the car navigation device 10, moving image data and position data at intervals of time t are associated with each other, and they are stored in the memory (memory device 38). When map data is displayed, the leading image (the image of the first frame) of the moving image data (t, t×1, t×2, . . . ) at each time is displayed on the corresponding position of the map based on the respective position data. When the user selects an image on the map, the car navigation device 10 starts to reproduce the moving image data from the selected image.

Figure 13:
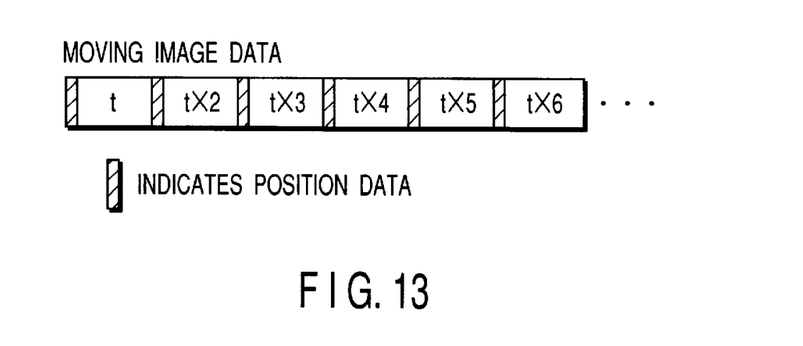
FIG. 13 is a diagram illustrating a state in which position data is inserted to moving image data.

In the method shown in FIG. 12, moving image data pieces and position data pieces at intervals of time t, which respectively correspond to the position data pieces are stored separately; however alternatively, it is also possible to have a format in which position data at intervals of time t are inserted to moving image data.

Figure 14:
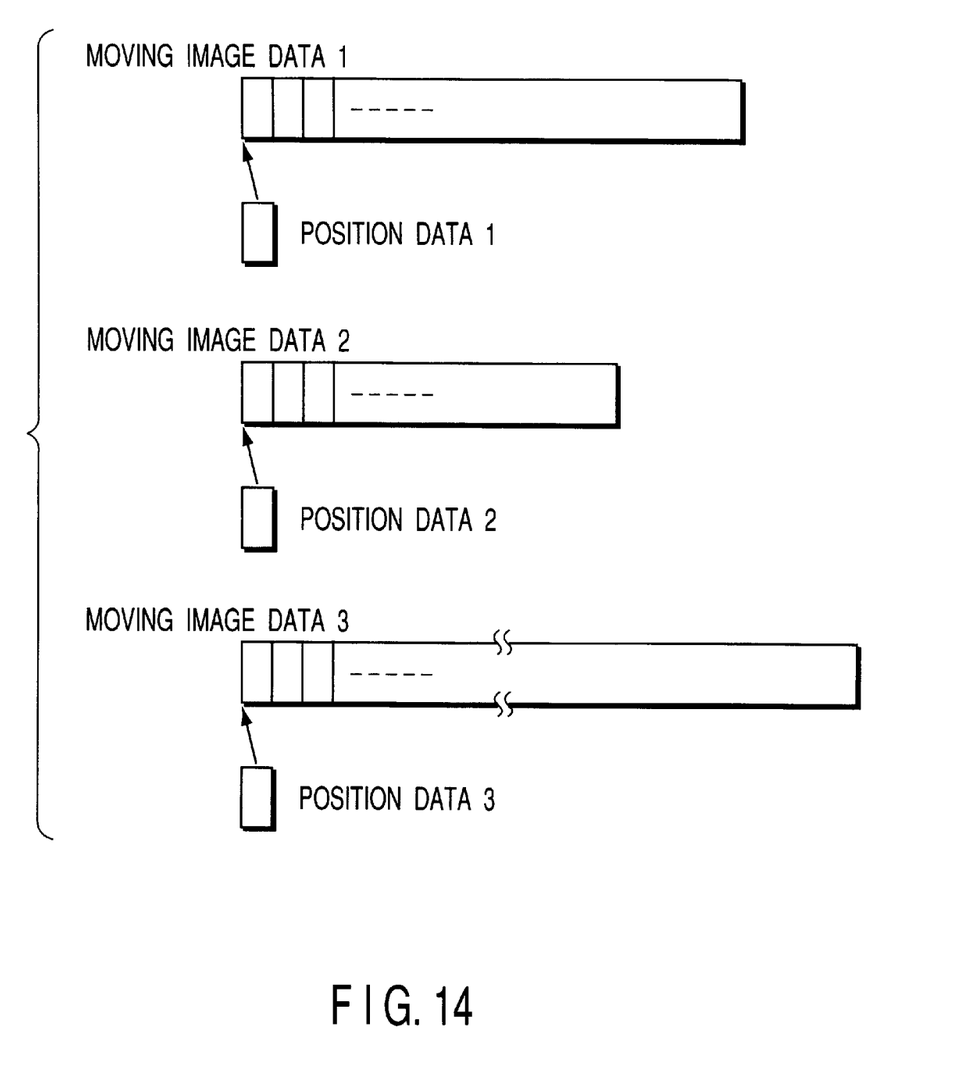
FIG. 14 is a diagram illustrating another method of adding moving image data to position data.

Another method is shown in FIG. 14.

The method shown in FIG. 12 is based on the case where scenes are shot with the video camera 80 while the user is traveling. However, in reality, the shooting is done in the same place in many cases. In such cases, the position data do not change if the time elapses by t, and therefore it is meaningless to acquire the position data at intervals of time t.

Under these circumstances, the position data are acquired when the shooting bottom of the video camera 80 is pressed. When the stop button is pressed, the position data is added to the moving image data pieces obtained up to that point, and the data pieces are transferred to the car navigation device 10. In an example shown in FIG. 14, position data 1 to 3 are added to three types of moving image data 1 to 3. The moving image data 1 to 3 are each taken from when the shooting button is pressed to when the stop button is pressed, and each data consists of a plurality of frame images. Further, the position data 1 to 3 are obtained from, for example, the car navigation device 10 when the shooting is started. It should be noted that the position data 1 to 3 are of a format in which they are inserted in the moving image data 1 to 3.

In the car navigation device 10, moving image data and position data at intervals of time t are associated with each other, and they are stored in the memory (memory device 38). When map data is displayed, the leading image (the image of the first frame) of each of the moving image data 1 to 3 is displayed on the corresponding position of the map based on the respective position data. When the user selects an image on the map, the car navigation device 10 starts to reproduce the moving image data from the selected image.

Further, a similar operation to the above is carried out in the case of sound data. That is, position data obtained at intervals of time t are added to sound data input from a sound input device 90, or position data obtained at the point when the sound input is started is added to sound data, and then the data are transferred to the car navigation device 10. In the car navigation device 10, sound data and position data at intervals of time t are associated with each other, and they are stored in the memory (memory device 38). When map data is displayed, an icon indicating sound is displayed on the corresponding position of the map based on the respective position data. When the user selects the icon on the map, the car navigation device 10 starts to reproduce the sound data corresponding to the selected icon.

Further, before the moving image data or sound data are transferred, the authentication process is executed between the devices as described in the point (4), and only when the authentication is confirmed, the transfer of moving image data or sound data are permitted. Thus, the security can be maintained.

As described above, not only the case of still images, but also the case of data varying time serially, such as moving image and sound, similar advantages to those of the points (1) to (6) can be obtained. Further, such a user interface that moving image or sound is reproduced from an arbitrary position by utilizing the position data can be realized, and therefore it is possible to omit a troublesome operation such as instant access to a desired section of data.

It should be noted that the present invention is not limited to the data of still images, moving images and sound, described above, but it can be applied to a case where other types of data than those of the above are transferred.

Further, the device which receives and processes such data is not limited to the car navigation device 10, but it may be, for example, a personal computer having a map displaying function.

Furthermore, the device on the opponent side is not limited to the display of a map, but the present invention can be applied to all of devices which execute any kind of process on the basis of data received from some other device.

Thus, the present invention is not limited to the above-described embodiments, but it may be remodeled into various versions as long as the essence of the invention remains within its scope.

As described above, according to the present invention, data necessary for a process is given to an information processing device, and a predetermined process can be quickly executed without having to use an IC memory, such as in the case where image data taken with an image pickup device are associated with position data, and then displayed on a map.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing system comprising:
   an information device; and
   an information processing device,
   wherein the information device comprises:
      a position acquiring unit configured to acquire position data indicating a current position from a device separate from the information processing device, and
      a transfer unit configured to output a request to transfer predetermined data processed by the information device to the information processing device and, when a response to the transfer request occurs, transfer the predetermined data to the information processing device after adding the position data obtained by the position acquiring unit to the predetermined data;
   and wherein the information processing device comprises:
      a data receiving unit configured to receive the predetermined data with the position data added thereto, in response to the transfer request from the information device,
      a recording unit configured to record the predetermined data and position data received by the data receiving unit while the predetermined data and the position data associated with each other, and
      a data processing unit configured to execute a predetermined process on the basis of the predetermined data and the position data, recorded on the recording unit.

2. A system according to claim 1, wherein the device separate from the information processing device is a mobile phone which receives a position information service from a base station.

3. A system according to claim 1, wherein the device separate from the information processing device is a mobile phone equipped with a position measuring device.

4. A system according to claim 1, wherein the transfer unit transfers the predetermined data, after adding the position data, to the external device via a radio communication.

5. An information device having a communication facility of data communications with an external device, comprising:

- a position acquiring unit configured to acquire position data indicating a current position from a device separate from the external device;
- a transfer unit configured to output a request to transfer predetermined data processed by the information device to the external device and, when a response to the transfer request occurs, transfer the predetermined data to the external device after adding the position data obtained by the position acquiring unit to the predetermined data.

6. The information device according to claim 5, wherein the device separate from the external device is a mobile phone that receives position information service from a base station.

7. The information device according to claim 5, wherein the device separate from the external device is a mobile phone equipped with a position measuring device.

8. The information device according to claim 5, wherein the transfer unit transfers the predetermined data, after adding the position data, to the information processing device via a radio communication.

* * * * *